United States Patent
Huang et al.

(10) Patent No.: US 10,797,311 B2
(45) Date of Patent: Oct. 6, 2020

(54) LITHIUM NICKEL COBALT MANGANESE OXIDE COMPOSITE MATERIAL AND METHOD OF MAKING SAME

(71) Applicant: Long Power Systems Rugao Co., Ltd., Nantong, Jiangsu (CN)

(72) Inventors: Richard Brian Huang, Las Vegas, NV (US); Donald Sadoway, Cambridge, MA (US); Min Ting, Jiangsu (CN)

(73) Assignee: Long Power Systems (Nantong) Co., Ltd., Nantong (CN)

( * ) Notice: Subject to any disclaimer, the term of this patent is extended or adjusted under 35 U.S.C. 154(b) by 170 days.

(21) Appl. No.: 16/211,080

(22) Filed: Dec. 5, 2018

(65) Prior Publication Data
US 2020/0099047 A1    Mar. 26, 2020

(30) Foreign Application Priority Data
Sep. 26, 2018 (CN) .......................... 2018 1 1122515

(51) Int. Cl.
| H01M 4/13 | (2010.01) |
| H01M 4/36 | (2006.01) |
| H01M 4/505 | (2010.01) |
| H01M 4/525 | (2010.01) |
| H01M 4/62 | (2006.01) |
| H01M 10/0525 | (2010.01) |

(52) U.S. Cl.
CPC .......... *H01M 4/366* (2013.01); *H01M 4/505* (2013.01); *H01M 4/525* (2013.01); *H01M 4/628* (2013.01); *H01M 10/0525* (2013.01)

(58) Field of Classification Search
CPC ...... H01M 4/366; H01M 4/505; H01M 4/525; H01M 4/628; H01M 10/0525
See application file for complete search history.

(56) References Cited

U.S. PATENT DOCUMENTS

| 2010/0173197 A1* | 7/2010 | Li ........................ H01M 4/505 429/220 |
| 2017/0294652 A1* | 10/2017 | Arimoto ................ C01G 53/42 |
| 2018/0083262 A1* | 3/2018 | Zhou ................ H01M 10/0525 |

* cited by examiner

*Primary Examiner* — Raymond Alejandro
(74) *Attorney, Agent, or Firm* — Wayne & Ken, LLC; Tony Hom

(57) ABSTRACT

The invention relates to lithium ion battery, more particularly to a lithium nickel cobalt manganese oxide (Li($Ni_{0.8}Co_{0.1}Mn_{0.1}$)$O_2$) composite material, including lithium nickel cobalt manganese oxide and a hydrophobic material coated on the surface of lithium nickel cobalt manganese oxide. The hydrophobic material coated on the surface of lithium nickel cobalt manganese oxide is insoluble in water, so that the lithium nickel cobalt manganese oxide composite material solves the problem that the batteries using conventional lithium nickel cobalt manganese oxide materials easily absorb water. A method for preparing the lithium nickel cobalt manganese oxide composite material is also disclosed.

10 Claims, 3 Drawing Sheets

LITHIUM NICKEL COBALT MANGANESE OXIDE COMPOSITE MATERIAL AND METHOD OF MAKING SAME

CROSS-REFERENCE TO RELATED APPLICATIONS

This application claims the benefit of priority from Chinese Application No. 201811122515.3, filed on Sep. 26, 2018. The entire content of the aforementioned application, including any intervening amendments thereto, is incorporated herein by reference.

TECHNICAL FIELD

The invention relates to lithium ion battery, more particularly to a lithium nickel cobalt manganese oxide composite material and a method for making the same.

BACKGROUND

Currently, lithium nickel cobalt manganese oxide, as the most popular ternary battery material, is considered as the general trend for the development of battery industry in the future. This material uses nickel, cobalt and manganese as raw materials and different electrode characteristics can be obtained by adjusting the ratio of the three materials. There is an increasing requirement for battery life and specific energy as the new energy vehicles continue to grow. High-nickel ternary materials, especially the development of 811 products, have caught much attention due to their superior specific energy resulted from the increased ratio of nickel.

Buses using ternary lithium battery access the market, and the ternary lithium battery will become an easy choice to meet the energy density requirement by new energy vehicles. Further, the ternary NCM 811 system is particularly important to reach a single cell energy density of 350 wh/kg in 2020. In addition, the proportion of cobalt as a scarce source in the ternary 811 is relatively small, so that the ternary NCM 811 is less affected by the cobalt price.

However, NCM 811 easily absorbs water and has a problem with processing during the manufacture of battery, which is not suitable for large-scale applications in the field of power and energy storage.

SUMMARY

In order to solve the above problems, the invention provides a lithium nickel cobalt manganese oxide (Li$(Ni_{0.8}Co_{0.1}Mn_{0.1})O_2$) composite material and a method for making the same.

In a first aspect, the invention provides a method for preparing a lithium nickel cobalt manganese oxide (Li$(Ni_{0.8}Co_{0.1}Mn_{0.1})O_2$) composite material, comprising:

(1) adding a lithium source, a nickel source, a manganese source and a cobalt source in a stoichiometric ratio of Ni: Co: Mn=0.8: 0.1: 0.1 in a solvent followed by a first ball-milling to produce a mixture; subjecting the mixture to a first calcination and then cooling the mixture to produce a precursor;

(2) subjecting the precursor to a second ball-milling in a sand mill followed by spray drying; subjecting the precursor to a second calcination to produce a lithium nickel cobalt manganese oxide material; and (3) stirring the lithium nickel cobalt manganese oxide material in a solution of a hydrophobic material, drying and carrying out a third calcination to produce the lithium nickel cobalt manganese oxide (Li$(Ni_{0.8}Co_{0.1}Mn_{0.1})O_2$) composite material.

In an embodiment, in step (1), the solvent used in the first ball-milling is one of acetone and ethanol, and a ball-milling time is 2-5 hours.

In an embodiment, in step (2), a solvent used in the second ball-milling is deionized water, and a ball-milling time is 2-5 hours.

In an embodiment, the first calcination is carried out at 300-500° C. for 0.5-10 hours; the second calcination is carried out at 500-1000° C. for 0.5-15 hours; and the third calcination is carried out at 150-350° C. for 0.5-10 hours.

In an embodiment, in step (3), the drying is spray drying at 110-300° C.

In an embodiment, the first calcination and the second calcinations are separately carried out under an oxygen atmosphere, and the third calcination is carried out under a nitrogen atmosphere.

In an embodiment, the hydrophobic material is 0.1%-5% by weight of the lithium nickel cobalt manganese oxide.

In an embodiment, the hydrophobic material is a polyurethane material.

In an embodiment, the lithium source is one of lithium carbonate, lithium hydroxide and lithium acetate. The nickel source is one of nickel oxalate, nickel nitrate, nickel carbonate and nickel hydroxide. The manganese source is one of manganese nitrate, manganese carbonate and manganese hydroxide. The cobalt source is one of cobalt nitrate, cobalt hydroxide and tricobalt tetraoxide.

In an embodiment, the cooling is air cooling.

In a second aspect, the invention provides a lithium nickel cobalt manganese oxide (Li$(Ni_{0.8}Co_{0.1}Mn_{0.1})O_2$) composite material prepared by the above methods, comprising a lithium nickel cobalt manganese oxide body and a hydrophobic material coated on a surface of the lithium nickel cobalt manganese oxide body.

In an embodiment, the hydrophobic material is a polyurethane material.

In an embodiment, the hydrophobic material is 0.1%-5% by weight of the lithium nickel cobalt manganese oxide (Li$(Ni_{0.8}Co_{0.1}Mn_{0.1})O_2$) composite material.

In an embodiment, the hydrophobic material is 0.3%-3% by weight of the lithium nickel cobalt manganese oxide 811.

The lithium nickel cobalt manganese oxide (Li$(Ni_{0.8}Co_{0.1}Mn_{0.1})O_2$) composite material comprises lithium nickel cobalt manganese oxide and a hydrophobic material coated on a surface of the lithium nickel cobalt manganese oxide. The hydrophobic material coated on the surface of the lithium nickel cobalt manganese oxide separates the lithium nickel cobalt manganese oxide from the outside. Therefore, compared to the conventional lithium nickel cobalt manganese oxide material, the present lithium nickel cobalt manganese oxide (Li$(Ni_{0.8}Co_{0.1}Mn_{0.1})O_2$) composite material makes an improvement on the problem that the lithium nickel cobalt manganese oxide easily absorbs water.

Furthermore, the preparation of the lithium nickel cobalt manganese oxide (Li$(Ni_{0.8}Co_{0.1}Mn_{0.1})O_2$) composite material is simple, which is suitable for large-scale industrial production.

DETAILED DESCRIPTION OF EMBODIMENTS

The above described objects, features and advantages of the present invention will become more apparent from the aspects of the appended claims. Numerous specific details are set forth in the description below in order to provide a thorough understanding of the invention. However, the present invention can be implemented in many other ways than those described herein, and those skilled in the art can make similar modifications without departing from the spirit of the invention, and thus the invention is not limited by the specific embodiments disclosed below.

Unless otherwise defined, all technical and scientific terms used herein have the same meaning as commonly understood by those skilled in the art. The terminology used in the description of the present invention is for the purpose of describing particular embodiments and is not intended to limit the invention. The term "and/or" used herein includes any and all combinations of one or more of the associated listed items.

Introduction and Summary

The present invention is illustrated by way of example without limiting the scope of the invention. It should be noted that "a" or "an" embodiment described in the present disclosure does not necessarily mean the same embodiment, but rather at least one.

Figure 1:
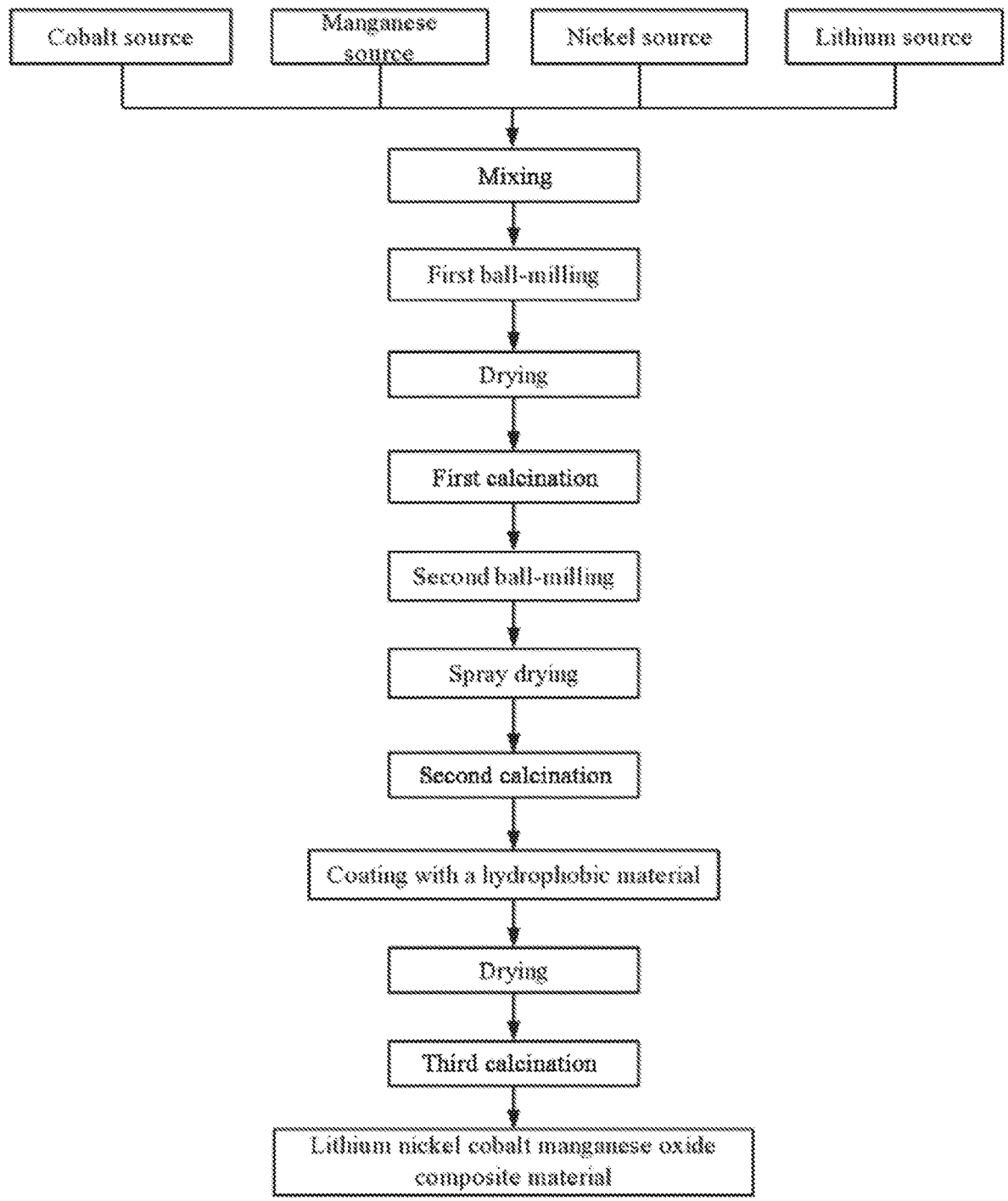
FIG. 1 is a flow chart of the preparation of a lithium nickel cobalt manganese oxide (Li$(Ni_{0.8}Co_{0.1}Mn_{0.1})O_2$) composite material according to an embodiment.
Figure 2:
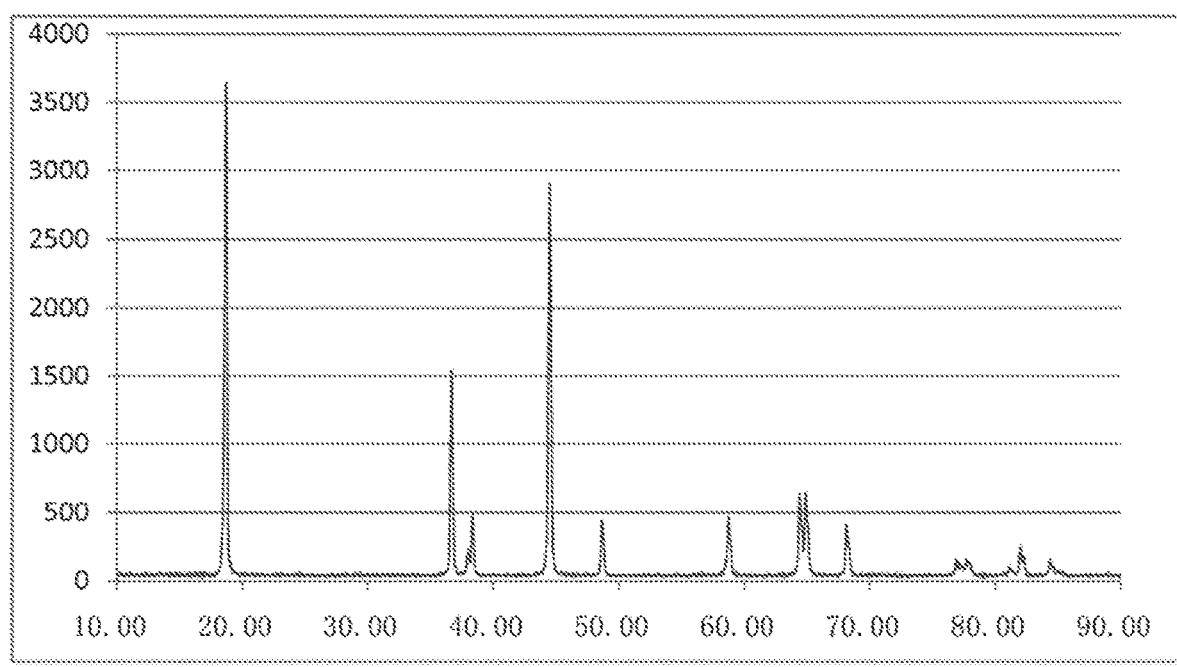
FIG. 2 is an XRD pattern of a lithium nickel cobalt manganese oxide (Li(Ni$_{0.8}$Co$_{0.1}$Mn$_{0.1}$)O$_2$) composite material prepared in Example 1.

As shown in FIG. 1, a method of preparing the above lithium nickel cobalt manganese oxide (Li(Ni$_{0.8}$Co$_{0.1}$Mn$_{0.1}$)O$_2$) composite material comprises the following steps:

adding a lithium source, a nickel source, a manganese source and a cobalt source in a stoichiometric ratio of Ni: Co: Mn in a solvent followed by a first ball-milling in a stirring mill to produce a mixture;

subjecting the mixture to a first calcination at 300-500° C. for 0.5-10 hours, and then cooling to produce a precursor;

subjecting the precursor to a second ball-milling in a sand mill (for example, a high-speed sand mill) for 2-5 hours for nanocrystallization to produce a slurry;

spray drying the slurry at 110-200° C. followed by a second calcination in an inert atmosphere at 500-800° C. for 0.5-6 hours to produce lithium nickel cobalt manganese oxide material 811; and stirring the lithium nickel cobalt manganese oxide material 811 in a solution of a hydrophobic material, drying and carrying out a third calcination under nitrogen atmosphere at 150-350° C. for 0.5-10 hours to produce the lithium nickel cobalt manganese oxide 811 composite material.

Equipments: SX-200 Sand mill (Wuxi Xinguang Powder Technology Co., Ltd., China); LP-12 Spray dryer (Shanghai Gaoling Technology Development Co., Ltd., China); OTL1200-11 Tube/box-type furnace (Hefei Hengli Eletek Co., Ltd., Anhui, China); and HXL004-12 Air box-type furnace (Hefei Hengli Eletek Co., Ltd., Anhui, China).

EXAMPLE 1

To 500 mL of ethanol were added 36.95 g of lithium carbonate, 74.17 g of nickel hydroxide, 8.9 g of manganese hydroxide and 9.3 g of cobalt hydroxide which were mixed. The mixture was stirred for 2 hours in a stirring mill to produce a slurry. The slurry was dried in a blast air oven. The dried slurry was subjected to a first calcination under oxygen atmosphere at 400° C. for 5 hours and then cooled to produce a precursor.

The precursor was subjected to a second ball-milling in a high-speed sand mill for 3 hours for nanocrystallization. The sanded slurry was spray dried at 110° C., and then subjected to a second calcination under oxygen atmosphere at 750° C. for 10 hours to produce a lithium nickel cobalt manganese oxide (Li(Ni$_{0.8}$Co$_{0.1}$Mn$_{0.1}$)O$_2$) material.

The resulting lithium nickel cobalt manganese oxide material was stirred in an acetone solution of a polyurethane material to produce a mixed solution. The mixed solution was dried in a blast air oven, and then subjected to a third calcination under nitrogen atmosphere at 250° C. for 5 hours to produce a lithium nickel cobalt manganese oxide (Li(Ni$_{0.8}$Co$_{0.1}$Mn$_{0.1}$)O$_2$) composite material.

EXAMPLE 2

To 500 mL of acetone were added 41.95 g of lithium hydroxide monohydrate, 232.65 g of nickel nitrate, 17.9 g of manganese nitrate and 29.1 g of cobalt nitrate which were mixed. The mixture was stirred for 3 hours in a stirring mill to produce a slurry. The slurry was dried in a blast air oven. The dried slurry was subjected to a first calcination under oxygen atmosphere at 450° C. for 4 hours and then cooled to produce a precursor.

The precursor was subjected to a second ball-milling in a high-speed sand mill for 4 hours for nanocrystallization. The sanded slurry was spray dried at 105° C., and then subjected to a second calcination under oxygen atmosphere at 780° C. for 8 hours to produce a lithium nickel cobalt manganese oxide (Li(Ni$_{0.8}$Co$_{0.1}$Mn$_{0.1}$)O$_2$) material.

The resulting lithium nickel cobalt manganese oxide material was stirred in an acetone solution of a polyurethane material to produce a mixed solution. The mixed solution was dried in a blast air oven, and then subjected to a third calcination under nitrogen atmosphere at 250° C. for 6 hours to produce a lithium nickel cobalt manganese oxide (Li(Ni$_{0.8}$Co$_{0.1}$Mn$_{0.1}$)O$_2$) composite material.

Figure 3:
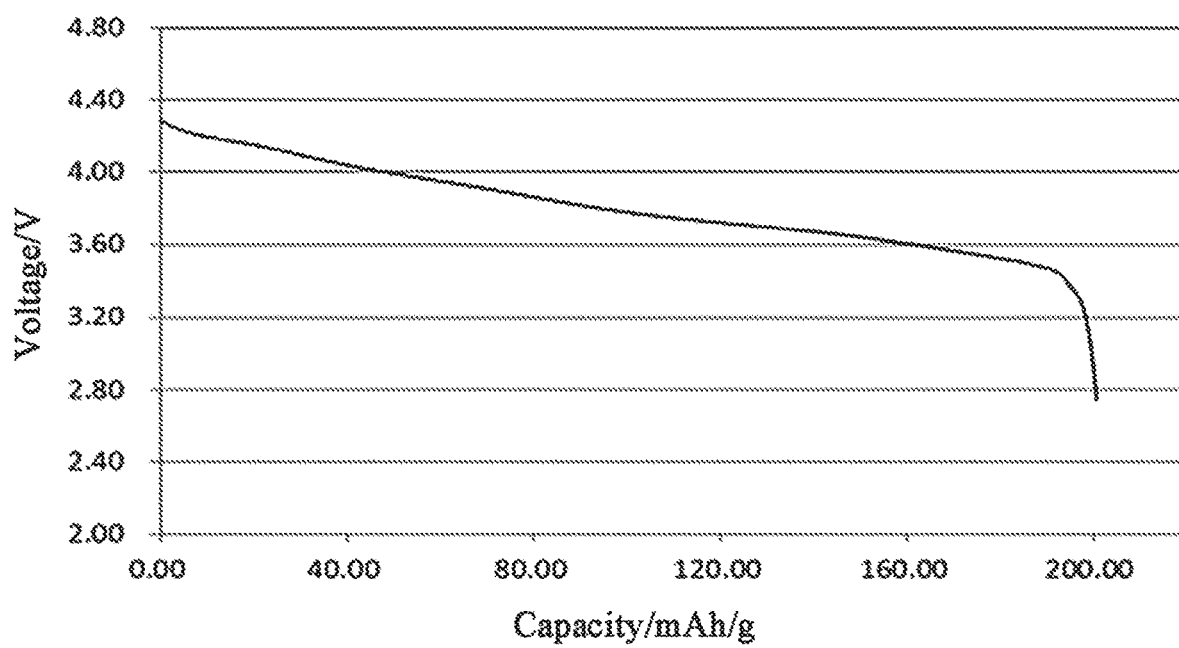
FIG. 3 is a graph showing a charge/discharge curve at a discharge rate of 0.2 C of a lithium nickel cobalt manganese oxide (Li(Ni$_{0.8}$Co$_{0.1}$Mn$_{0.1}$)O$_2$) composite material prepared in Example 2.

The lithium nickel cobalt manganese oxide Li(Ni$_{0.8}$Co$_{0.1}$Mn$_{0.1}$)O$_2$ composite material was discharged at 0.2 C rate, and its capacity was up to 200 mAh/g, as shown in FIG. 3.

The above embodiments are merely preferred embodiments of the invention, and it should be noted that various modifications or substitutions made by those skilled in the art without departing from the spirit of the invention should also fall within the scope of the invention.

What is claimed is:

1. A method of preparing a lithium nickel cobalt manganese oxide (Li(Ni$_{0.8}$Co$_{0.1}$Mn$_{0.1}$)O$_2$) composite material, comprising:

(1) adding a lithium source, a nickel source, a manganese source and a cobalt source in a stoichiometric ratio of Ni: Co: Mn=0.8: 0.1: 0.1 in a solvent followed by a first ball-milling to produce a mixture; subjecting the mixture to a first calcination and then cooling the mixture to produce a precursor;

(2) subjecting the precursor to a second ball-milling in a sand mill followed by spray drying; subjecting the precursor to a second calcination to produce a lithium nickel cobalt manganese oxide material; and (3) stirring the lithium nickel cobalt manganese oxide material in a solution of a hydrophobic material, drying and carrying out a third calcination to produce the lithium nickel cobalt manganese oxide (Li($Ni_{0.8}Co_{0.1}Mn_{0.1}$)$O_2$) composite material.

2. The method of claim 1, wherein in step (1), the solvent used in the first ball-milling is selected from acetone or ethanol, and a ball-milling time is 2-5 hours.

3. The method of claim 1, wherein in step (2), a solvent used in the second ball-milling is deionized water, and a ball-milling time is 2-5 hours.

4. The method of claim 1, wherein the first calcination is carried out at 300-500° C. for 0.5-10 hours; the second calcination is carried out at 500-1000° C. for 0.5-15 hours; and the third calcination is carried out at 150-350° C. for 0.5-10 hours.

5. The method of claim 1, wherein in step (3), the drying is spray drying at 110-300° C.

6. The method of claim 1, wherein the first calcination and the second calcination are separately carried out under an oxygen atmosphere; and the third calcination is carried out under a nitrogen atmosphere.

7. The method of claim 1, wherein the hydrophobic material is 0.1%-5% by weight of the lithium nickel cobalt manganese oxide.

8. The method of claim 1, wherein the hydrophobic material is a polyurethane material.

9. A lithium nickel cobalt manganese oxide (Li($Ni_{0.8}Co_{0.1}Mn_{0.1}$)$O_2$) composite material prepared by the method of claim 1, comprising a 811 lithium nickel cobalt manganese oxide body and a hydrophobic material coated on a surface of the 811 lithium nickel cobalt manganese oxide body.

10. The lithium nickel cobalt manganese oxide (Li($Ni_{0.8}Co_{0.1}Mn_{0.1}$)$O_2$) composite material of claim 9, wherein the hydrophobic material is a polyurethane material.

* * * * *